(12) United States Patent
Chen et al.

(10) Patent No.: US 11,341,380 B2
(45) Date of Patent: May 24, 2022

(54) CONSUMABLE CHARACTERISTIC IDENTIFICATION

(71) Applicants: Hewlett-Packard Development Company, L.P., Spring, TX (US); Feng Chen, Shanghai (CN); Jialiang Lv, Shanghai (CN); Guo Liang Nan, Shanghai (CN)

(72) Inventors: Feng Chen, Shanghai (CN); Jialiang Lv, Shanghai (CN); Guo Liang Nan, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/048,035

(22) PCT Filed: Aug. 3, 2018

(86) PCT No.: PCT/CN2018/098549
§ 371 (c)(1),
(2) Date: Oct. 15, 2020

(87) PCT Pub. No.: WO2020/024267
PCT Pub. Date: Feb. 6, 2020

(65) Prior Publication Data
US 2021/0166095 A1    Jun. 3, 2021

(51) Int. Cl.
*G06K 15/02* (2006.01)
*G06K 7/10* (2006.01)
*G06K 15/00* (2006.01)

(52) U.S. Cl.
CPC ....... *G06K 15/021* (2013.01); *G06K 7/10297* (2013.01); *G06K 15/407* (2013.01); *G06K 15/4065* (2013.01)

(58) Field of Classification Search
None
See application file for complete search history.

(56) References Cited

U.S. PATENT DOCUMENTS

| | | | |
|---|---|---|---|
| 6,598,795 B1 | 7/2003 | Prenn | |
| 6,651,975 B2 | 11/2003 | Ohtsuka et al. | |
| 6,985,682 B2 | 1/2006 | Haines et al. | |
| 7,072,596 B2 | 7/2006 | Smith | |
| 7,102,798 B2 | 9/2006 | Haines | |
| 8,245,907 B2 | 8/2012 | Liang et al. | |
| 8,412,062 B2 | 4/2013 | Kielland | |
| 2003/0072030 A1 | 4/2003 | Haines et al. | |

(Continued)

FOREIGN PATENT DOCUMENTS

| | | |
|---|---|---|
| CN | 105599465 A | 5/2016 |
| CN | 107089057 A | 8/2017 |

*Primary Examiner* — Lennin R Rodriguezgonzalez
(74) *Attorney, Agent, or Firm* — Dicke Billig & Czaja PLLC

(57) ABSTRACT

A consumable characteristic identification method is provided. The method comprises the following steps: detecting a consumable package (210); identifying a characteristic about a consumable associated with the consumable package (215); modifying a device setting according to the identified characteristic (220); and appending a log entry associated with the consumable package to a user activity log (225). A consumable characteristic identification apparatus and no-transitory machine-readable storage medium are also provided.

15 Claims, 3 Drawing Sheets

(56) References Cited

U.S. PATENT DOCUMENTS

| | | |
|---|---|---|
| 2003/0095810 A1 | 5/2003 | Haines et al. |
| 2006/0239742 A1 | 10/2006 | Bateman |
| 2010/0092201 A1 | 4/2010 | Kielland |
| 2015/0242172 A1 | 8/2015 | Murphy et al. |
| 2015/0288464 A1* | 10/2015 | Tanner ................ H04B 5/0031 455/41.1 |
| 2016/0088170 A1 | 3/2016 | Murphy et al. |
| 2017/0126925 A1* | 5/2017 | Sasaki ................ H04N 1/00832 |
| 2017/0286546 A1* | 10/2017 | Cardonha ......... G06F 16/24578 |

* cited by examiner

CONSUMABLE CHARACTERISTIC IDENTIFICATION

BACKGROUND

Multi-function devices often combine different components such as a printer, scanner, and copier into a single device. Such devices frequently receive refills of consumables, such as print substances (e.g., ink, toner, and/or additive materials) and/or media (e.g., paper, vinyl, and/or other print substrates).

Figure 1:
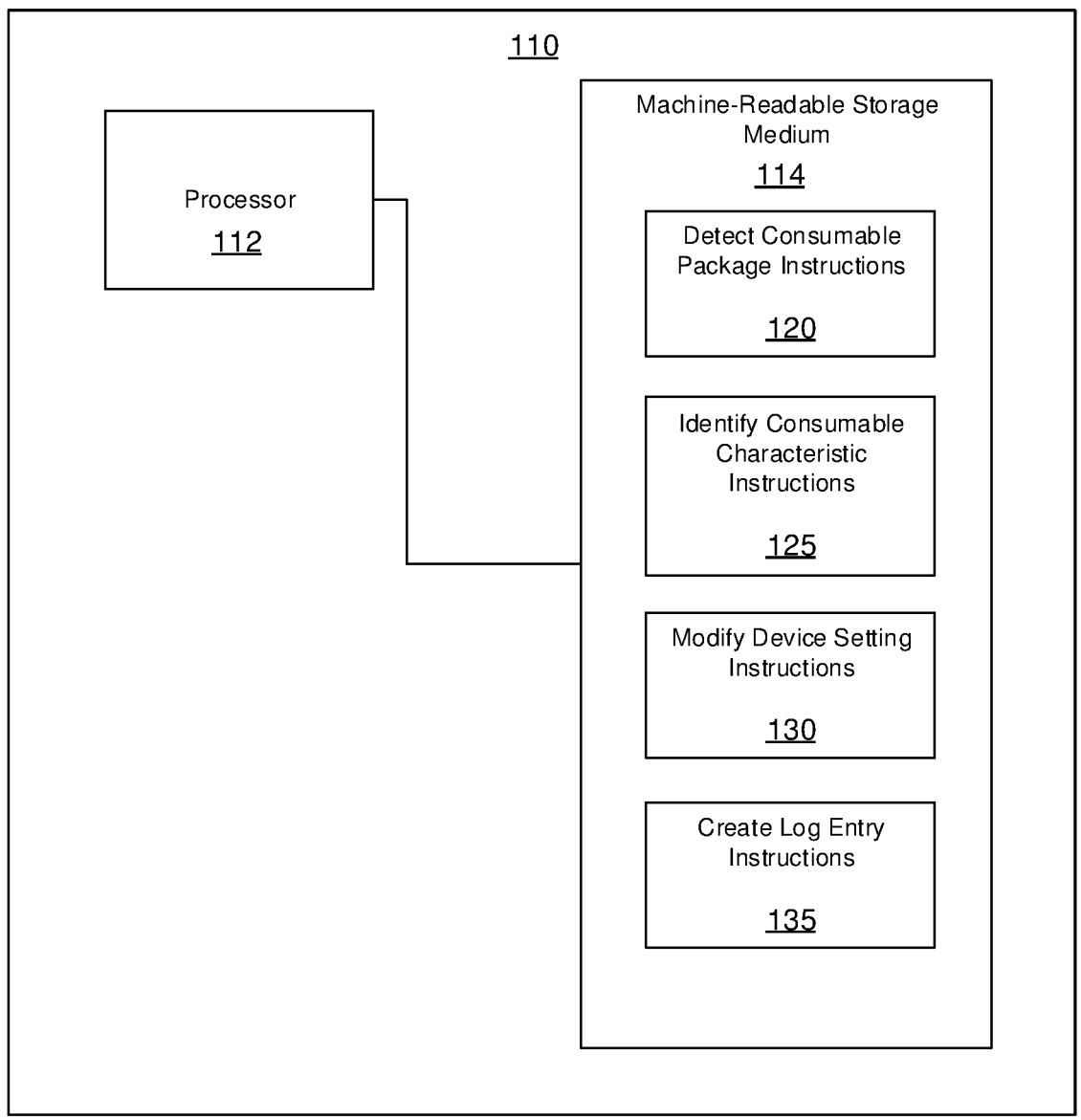
FIG. 1 is a block diagram of an example computing device for providing consumable characteristic identification.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

Most multi-function-print devices (MFPs) provide several features, such as an option to scan a physical document, which may be controlled via an on-device control panel, a connected application, and/or a remote service. Other options may include printing, copying, faxing, document assembly, etc. The scanning portion of an MFP may comprise an optical assembly located within a sealed enclosure. The sealed enclosure may have a scan window through which the optical assembly can scan a document, which may be placed on a flatbed and/or delivered by a sheet feeder mechanism.

Oftentimes, MFPs will need to receive consumables, such as ink, toner, media, and/or other materials and/or substrates. For purposes of example only, the implementations described below will use paper media as an example consumable, although other types of consumables are contemplated.

Different consumables, even of the same general type, may perform better with different settings enabled by the MFP. For example, recycled, uncoated paper may produce a higher quality image with a heavier amount of toner and a higher fuser temperature than first run paper that has been treated for use in laser printers. In most situations, the user would need to alter the device settings manually to account for these differences and modify the device settings each time a different type of consumable is used in the device.

In some implementations consistent with this disclosure, the consumable packaging may provide a way to automatically configure the device. Different devices may get better performance out of the same consumable type with different settings; for example, a single-function mono printer may perform better with a different paper pick speed than an enterprise class photocopier, even when using the same type, size and brand of paper media.

The printer settings to be configured may comprise any of the settings available to the device, including those accessible to the user via a control panel interface (e.g., finishing options, print quality level, media size, etc.) as well as those controlled by the device firmware (e.g., paper pick speed and torque, toner/ink saturation level, fuser/dryer temperature, etc.).

In some implementations, the device may detect the presence of a consumable package, identify a characteristic about a consumable associated with the consumable package, modify a device setting according to the identified characteristic, and create a log entry associated with the consumable package. The log entries, for example, may be compiled across multiple users, devices, and/or consumable types for analysis about which settings perform better or worse in different scenarios. For example, a user may load paper designed for a laser printer into an ink printer; the default settings loaded when the laser printer paper package is detected may perform poorly, resulting in color bleeding, for example, and the user may opt to manually adjust the settings. This information may be stored and/or shared with other users, and the next time the same paper consumable package is loaded into the device, the user's modified settings may be applied. The use of such consumables may also be used to track the amount of consumables being used by a device. Such usage tracking may be used to provide service and/or supply re-ordering alerts and/or reminders, for example.

FIG. 1 is a block diagram of an example computing device 110 for providing consumable characteristic identification. Computing device 110 may comprise a processor 112 and a non-transitory, machine-readable storage medium 114. Storage medium 114 may comprise a plurality of processor-executable instructions, such as detect consumable package instructions 120, identify consumable characteristic instructions 125, modify device setting instructions 130, and create log entry instructions 135. In some implementations, instructions 120, 125, 130, 135 may be associated with a single computing device 110 and/or may be communicatively coupled among different computing devices such as via a direct connection, bus, or network.

Processor 112 may comprise a central processing unit (CPU), a semiconductor-based microprocessor, a programmable component such as a complex programmable logic device (CPLD) and/or field-programmable gate array (FPGA), or any other hardware device suitable for retrieval and execution of instructions stored in machine-readable storage medium 114. In particular, processor 112 may fetch, decode, and execute instructions 120, 125, 130, 135.

Executable instructions 120, 125, 130, 135 may comprise logic stored in any portion and/or component of machine-readable storage medium 114 and executable by processor 112. The machine-readable storage medium 114 may comprise both volatile and/or nonvolatile memory and data storage components. Volatile components are those that do not retain data values upon loss of power. Nonvolatile components are those that retain data upon a loss of power.

The machine-readable storage medium 114 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Detect consumable package instructions 120 may detect a consumable package 150. In some implementations, the consumable package 150 may comprise a print media package (e.g. paper, vinyl, and/or other print substrates). In some implementations, the consumable package 150 may comprise other consumables, such as ink, toner, finishing supplies (e.g., staples), additive material for 3D printing, dyes, replaceable components, etc. The detection may be automatic upon sensing the consumable package 150, such as by a camera, and/or may be triggered manually, such as by a user selected option on a control panel.

Identify consumable characteristic instructions 125 may identify a characteristic about a consumable associated with the consumable package 150. For example, device 110 may comprise a camera to identify the package via optical recognition of the package design, elements of the design, codes printed on the package, and/or the like. In some implementations, instructions 125 may cause device 110 to scan a printed code on the consumable package 150, such as a UPC bar code and/or matrix code. In some implementations, instructions 125 may cause device 110 to read a radio frequency identifier (RFID) tag associated with the consumable package 150. In some implementations, the characteristic may comprise a media size (e.g., A3, A4, legal), type (e.g., recycled, coated, bonded, watermarked, heavy weight, light weight, ink, laser, etc.), and/or manufacturer (i.e., brand).

Identify consumable characteristic instructions 125 may receive, via the identification, an index code, for example, to look up the characteristic(s) about the consumable in a database, for example. Such a database may be stored locally on device 110 and/or may be stored on another device and accessed via a communication protocol, such as accessing a cloud-based service via the Internet. In some implementations, detect consumable package instructions 120 may retrieve the characteristic(s) directly from the package, such as via data encoded in a matrix bar code. The characteristic(s) may also comprise device setting information associated with the consumable.

Modify device setting instructions 130 may modify a device setting according to the identified characteristic. For example, a characteristic may comprise a media size, leading instructions 130 to modify device settings to print pages on media of the specified size. In another example, a characteristic may comprise a media type, such as coated, recycled paper for an ink-based printer. The settings for such a characteristic may modify the amount of ink saturation used to achieve different colors on the specific media type. In some implementations, the settings may comprise a learned set of modifications based on other user experiences with the same consumable type; users may provide feedback that may be included in the log entry provided by create log entry instructions 135. In some implementations, modify device instructions 130 may comprise instructions to maintain the modified device setting until a second consumable package is detected.

Create log entry instructions 135 may create a log entry associated with the consumable package 150. For example, the log entry may comprise information about device 110, the device settings used for the consumable package 150, operations performed by device 110 using the consumable associated with the consumable package 150, and/or a user associated with device 110. In some implementations, the log entry may comprise one of a plurality of log entries associated with a user of the consumable package 150. For example, the plurality of log entries may be associated with different users, different consumables and/or packages, and/or different operations.

Figure 2:
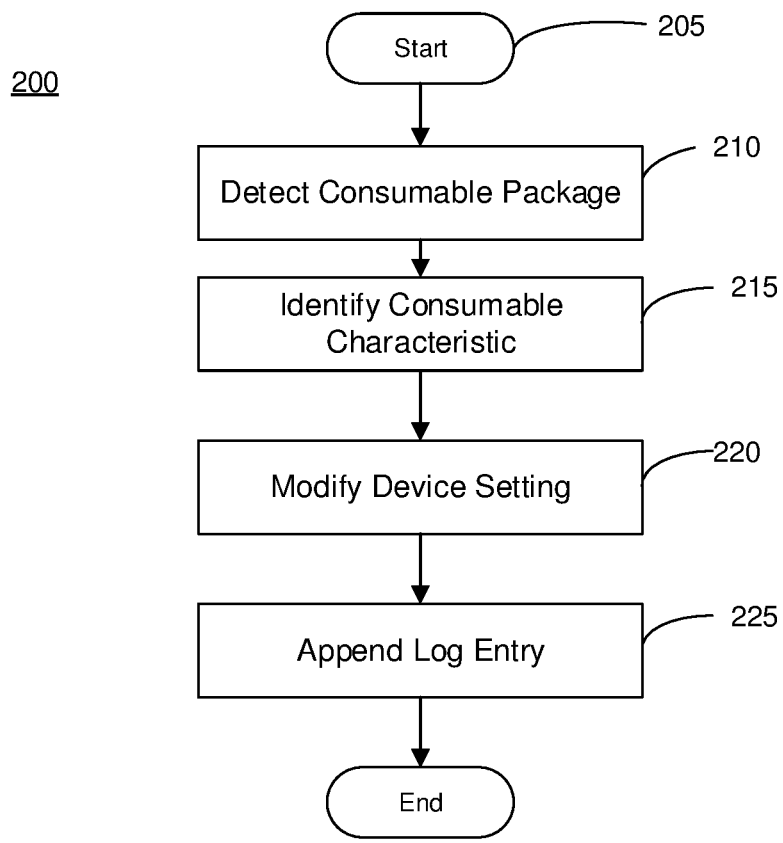
FIG. 2 is a flowchart of an example method for providing consumable characteristic identification.

FIG. 2 is a flowchart of an example method 200 for consumable characteristic identification. Although execution of method 200 is described below with reference to computing device 110, other suitable components for execution of method 200 may be used.

Method 200 may begin at stage 205 and advance to stage 210 where device 110 may detect a consumable package 150. For example, device 110 may execute detect consumable package instructions 120 to detect a consumable package 150. In some implementations, the consumable package 150 may comprise a print media package (e.g. paper, vinyl, and/or other print substrates). In some implementations, the consumable package 150 may comprise other consumables, such as ink, toner, finishing supplies (e.g., staples), additive material for 3D printing, dyes, replaceable components, etc. The detection may be automatic upon sensing the consumable package 150, such as by a camera, and/or may be triggered manually, such as by a user selected option on a control panel.

Method 200 may then advance to stage 215 where computing device 110 may identify a characteristic about a consumable associated with the consumable package 150. In some implementations, the characteristic may comprise at least one of a consumable size, a consumable type, and a consumable manufacturer. For example, device 110 may execute identify consumable characteristic instructions 125 to identify a characteristic about a consumable associated with the consumable package 150. For example, device 110 may comprise a camera to identify the package via optical recognition of the package design, elements of the design, codes printed on the package, and/or the like. In some implementations, instructions 125 may cause device 110 to scan a printed code on the consumable package 150, such as a UPC bar code and/or matrix code. In some implementations, instructions 125 may cause device 110 to read a radio frequency identifier (RFID) tag associated with the consumable package 150. In some implementations, the characteristic may comprise a media size (e.g., A3, A4, legal), type (e.g., recycled, coated, bonded, watermarked, heavy weight, light weight, ink, laser, etc.), and/or manufacturer (i.e., brand).

Identify consumable characteristic instructions 125 may receive, via the identification, an index code, for example, to look up the characteristic(s) about the consumable in a database, for example. Such a database may be stored locally on device 110 and/or may be stored on another device and accessed via a communication protocol, such as accessing a cloud-based service via the Internet. In some implementations, detect consumable package instructions 120 may retrieve the characteristic(s) directly from the package, such as via data encoded in a matrix bar code. The characteristic(s) may also comprise device setting information associated with the consumable.

Method 200 may then advance to stage 220 where computing device 110 may modify a device setting according to the identified characteristic. For example, device 110 may execute modify device setting instructions 130 to modify a device setting according to the identified characteristic. For example, a characteristic may comprise a media size, leading instructions 130 to modify device settings to print pages on media of the specified size. In another example, a characteristic may comprise a media type, such as coated, recycled paper for an ink-based printer. The settings for such a characteristic may modify the amount of ink saturation used to achieve different colors on the specific media type. In some implementations, the settings may comprise a learned set of modifications based on other user experiences with the same consumable type; users may provide feedback that may be included in the log entry provided by create log entry instructions 135. In some implementations, modify device instructions 130 may comprise instructions to maintain the modified device setting until a second consumable package is detected.

Method 200 may then advance to stage 225 where computing device 110 may append a log entry associated with the consumable package 150 to a user activity log. In some implementations, the user activity log may comprise a plurality of logged actions associated with a purchaser of the consumable package. For example, device 110 may execute create log entry instructions 135 to create a log entry associated with the consumable package 150. For example, the log entry may comprise information about device 110, the device settings used for the consumable package 150, operations performed by device 110 using the consumable associated with the consumable package 150, and/or a user associated with device 110. In some implementations, the log entry may comprise one of a plurality of log entries associated with a user of the consumable package 150. For example, the plurality of log entries may be associated with different users, different consumables and/or packages, and/or different operations.

In some implementations, the user activity log may be provided to a manufacturer of the consumable package. For example, the user activity log may comprise user feedback on the performance of the consumable using the modified settings. The user feedback may in turn be used to adjust the settings to be modified when the consumable package is detected.

Method 200 may then end at stage 250.

Figure 3:
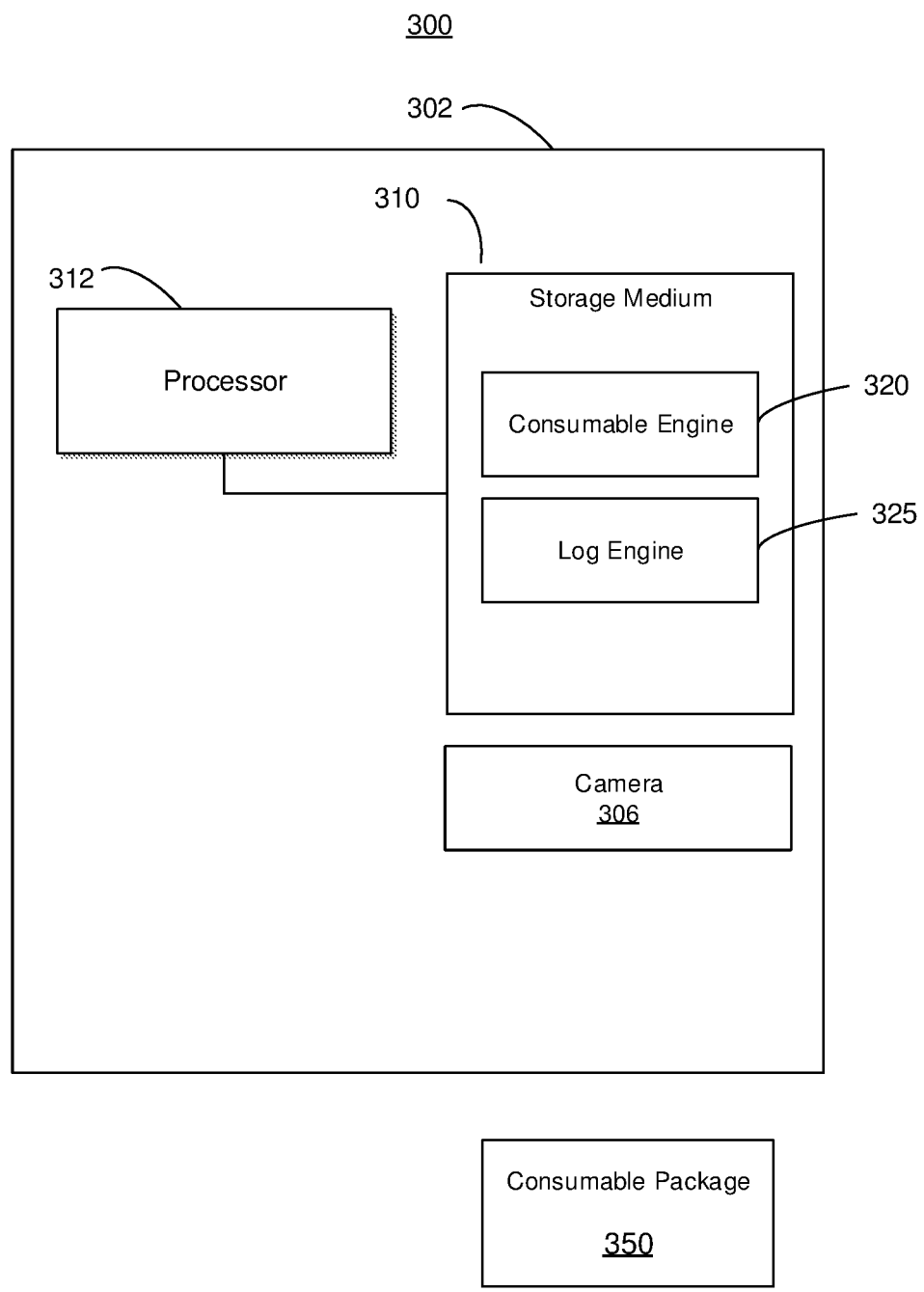
FIG. 3 is a block diagram of an example system for providing consumable characteristic identification.

FIG. 3 is a block diagram of an example apparatus 300 for providing consumable characteristic identification. Apparatus 300 may comprise a multi-function printer device 302 comprising a camera 306, a storage medium 310, and a processor 312. Device 302 may comprise and/or be associated with, for example, a general and/or special purpose computer, server, mainframe, desktop, laptop, tablet, smart phone, game console, printer, multi-function device, and/or any other system capable of providing computing capability consistent with providing the implementations described herein. Device 302 may store, in storage medium 310, a consumable engine 320 and a log engine 325.

Each of engines 320, 325 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 320, 325. In such examples, device 302 may comprise the machine-readable storage medium storing the instructions and the processing resource to execute the instructions, or the machine-readable storage medium may be separate but accessible to apparatus 300 and the processing resource.

Camera 306 may detect a consumable package 350 and scan a code displayed on the consumable package 350. For example, apparatus 300 may comprise camera 306 to identify the package via optical recognition of the package design, elements of the design, codes printed on the package, and/or the like. In some implementations, instructions 125 may cause device 110 to scan a printed code on the consumable package 150, such as a UPC bar code and/or matrix code. In some implementations, the consumable package 350 may comprise a print media package (e.g. paper, vinyl, and/or other print substrates). In some implementations, the consumable package 350 may comprise other consumables, such as ink, toner, finishing supplies (e.g., staples), additive material for 3D printing, dyes, replaceable components, etc. The detection may be automatic upon sensing the consumable package 350, such as by camera 306, and/or may be triggered manually, such as by a user selected option on a control panel.

Consumable engine 320 may identify a characteristic about a consumable associated with the consumable package 350 according to the scanned code and modify a device setting according to the identified characteristic. For example, consumable engine 320 may identify a characteristic about a consumable associated with the consumable package 150. In some implementations, the characteristic may comprise a media size (e.g., A3, A4, legal), type (e.g., recycled, coated, bonded, watermarked, heavy weight, light weight, ink, laser, etc.), and/or manufacturer (i.e., brand).

Consumable engine 320 may receive, via the identification, an index code, for example, to look up the characteristic(s) about the consumable in a database, for example. Such a database may be stored locally on device 110 and/or may be stored on another device and accessed via a communication protocol, such as accessing a cloud-based service via the Internet. In some implementations, detect consumable package instructions 120 may retrieve the characteristic(s) directly from the package, such as via data encoded in a matrix bar code. The characteristic(s) may also comprise device setting information associated with the consumable.

A characteristic may comprise a media size, leading engine 320 to modify device settings to print pages on media of the specified size. In another example, a characteristic may comprise a media type, such as coated, recycled paper for an ink-based printer. The settings for such a characteristic may modify the amount of ink saturation used to achieve different colors on the specific media type. In some implementations, the settings may comprise a learned set of modifications based on other user experiences with the same consumable type; users may provide feedback that may be included in the log entry provided by log engine 325. In some implementations, consumable engine 320 may comprise instructions to maintain the modified device setting until a second consumable package is detected.

Log engine 325 may append a log entry associated with the consumable package 350 to a user activity log. For example, log engine 325 may create a log entry associated with the consumable package 350. For example, the log entry may comprise information about apparatus 302, the device settings used for the consumable package 350, operations performed by apparatus 302 using the consumable associated with the consumable package 350, and/or a user associated with apparatus 302. In some implementations, the log entry may comprise one of a plurality of log entries associated with a user of the consumable package 350. For example, the plurality of log entries may be associated with different users, different consumables and/or packages, and/or different operations.

In the foregoing detailed description of the disclosure, reference is made to the accompanying drawings that form a part hereof, and in which is shown by way of illustration how examples of the disclosure may be practiced. These examples are described in sufficient detail to allow those of ordinary skill in the art to practice the examples of this disclosure, and it is to be understood that other examples may be utilized and that process, electrical, and/or structural changes may be made without departing from the scope of the present disclosure.

The invention claimed is:

1. A non-transitory machine-readable storage medium having stored thereon machine-readable instructions executable to cause a processor to:
    detect a consumable package;
    identify a characteristic about a consumable associated with the consumable package;
    modify a device setting according to the identified characteristic; and
    create a log entry associated with the consumable package, the log entry including user feedback of use of the consumable associated with the consumable package,
    wherein the instructions to modify the device setting comprise instructions to modify the device setting according to a learned set of modifications based on use of the consumable and the log entry including the user feedback of use of the consumable.

2. The medium of claim 1, wherein the consumable package comprises a print media package.

3. The medium of claim 2, wherein the characteristic comprises a media size.

4. The medium of claim 2, wherein the characteristic comprises a media type.

5. The medium of claim 2, wherein the characteristic comprises a media manufacturer.

6. The medium of claim 1, wherein the instructions to detect the consumable package comprise instructions to scan a printed code on the consumable package.

7. The medium of claim 1, wherein the instructions to detect the consumable package comprise instructions to read a radio frequency identifier (RFID) tag associated with the consumable package.

8. The medium of claim 1, wherein the instructions to modify the device setting comprise instructions to maintain the modified device setting until a second consumable package is detected.

9. The medium of claim 1, wherein the log entry comprises one of a plurality of log entries associated with a user of the consumable package.

10. A method comprising:
    detecting a consumable package;
    identifying a characteristic about a consumable associated with the consumable package;
    modifying a device setting according to the identified characteristic; and
    appending a log entry associated with the consumable package to a user activity log, the log entry including user feedback of use of the consumable associated with the consumable package,
    wherein modifying the device setting further comprises modifying the device setting according to a learned set of modifications based on use of the consumable and the log entry including the user feedback of use of the consumable.

11. The method of claim 10, wherein the user activity log comprises a plurality of logged actions associated with a purchaser of the consumable package.

12. The method of claim 10, wherein the user activity log may be provided to a manufacturer of the consumable package.

13. The method of claim 10, wherein detecting the consumable package comprises scanning a code displayed on the consumable package.

14. The method of claim 13, wherein the characteristic comprises at least one of a consumable size, a consumable type, and a consumable manufacturer.

15. An apparatus, comprising:
    a camera to:
        detect a consumable package, and
        scan a code displayed on the consumable package;
    a consumable engine to:
        identify a characteristic about a consumable associated with the consumable package according to the scanned code, and
        modify a device setting according to the identified characteristic; and
    a log engine to:
        append a log entry associated with the consumable package to a user activity log, the log entry including user feedback of use of the consumable associated with the consumable package,
    wherein the consumable engine is to:
        modify the device setting according to a learned set of modifications based on use of the consumable and the log entry including the user feedback of use of the consumable.

* * * * *